US011414977B2

United States Patent
Ramsay et al.

(10) Patent No.: US 11,414,977 B2
(45) Date of Patent: Aug. 16, 2022

(54) VIRTUAL DOWNHOLE SUB

(71) Applicant: ConocoPhillips Company, Houston, TX (US)

(72) Inventors: Stacey C. Ramsay, Houston, TX (US); Bradford L. Cobb, Houston, TX (US); Phil D. Anno, Houston, TX (US); Son V. Pham, The Woodlands, TX (US)

(73) Assignee: CONOCOPHILLIPS COMPANY, Houston, TX (US)

(*) Notice: Subject to any disclaimer, the term of this patent is extended or adjusted under 35 U.S.C. 154(b) by 0 days.

(21) Appl. No.: 16/363,408

(22) Filed: Mar. 25, 2019

(65) Prior Publication Data
US 2019/0292899 A1  Sep. 26, 2019

Related U.S. Application Data

(60) Provisional application No. 62/647,056, filed on Mar. 23, 2018.

(51) Int. Cl.
| *E21B 47/007* | (2012.01) |
| *E21B 44/04* | (2006.01) |
| *G01L 3/00* | (2006.01) |
| *G01P 15/18* | (2013.01) |
| *E21B 47/12* | (2012.01) |

(52) U.S. Cl.
CPC ............ *E21B 44/04* (2013.01); *E21B 47/12* (2013.01); *G01L 3/00* (2013.01); *G01P 15/18* (2013.01)

(58) Field of Classification Search
CPC ............................... E21B 47/007; E21B 44/00
See application file for complete search history.

(56) References Cited

U.S. PATENT DOCUMENTS 4,715,451 A * 12/1987 Bseisu .................. E21B 47/007
                                                                175/40
5,721,376 A    2/1998 Pavone et al.
(Continued)

FOREIGN PATENT DOCUMENTS

| AR | 015217 A1 | 4/2001 |
| AU | 2016262077 A1 | 12/2017 |

(Continued)

OTHER PUBLICATIONS

International Search Report and Written Opinion dated Jun. 6, 2019 in corresponding International Patent Application No. PCT/US2019/023400, 9 pgs.

(Continued)

*Primary Examiner* — Kipp C Wallace
(74) *Attorney, Agent, or Firm* — Polsinelli PC (57) ABSTRACT

A system and method to identify a dysfunction of a drill-string within a wellbore are provided. The system includes a sensor positioned proximate to a drill-string and proximate to a surface of the wellbore. The sensor is configured to sense a surface condition and generate measurement data. The system also includes a transmitter in communication with the sensor and configured to transmit the measurement data. The system also includes a receiver configured to receive the measurement data from the sensor. The system also includes a processor configured to calculate a downhole measurement based on the measurement data and analyze the downhole measurement to identify the dysfunction.

19 Claims, 5 Drawing Sheets

(56) References Cited

U.S. PATENT DOCUMENTS

| | | | |
|---|---|---|---|
| 5,774,418 A * | 6/1998 | Magendie | G01V 1/42 |
| | | | 367/25 |
| 5,844,132 A * | 12/1998 | Fabret | E21B 45/00 |
| | | | 73/152.45 |
| 6,021,377 A | 2/2000 | Dubinsky et al. | |
| 6,035,951 A | 3/2000 | Mercer et al. | |
| 6,208,586 B1 | 3/2001 | Rorden et al. | |
| 7,142,986 B2 | 11/2006 | Moran | |
| 7,596,481 B2 | 9/2009 | Zamora et al. | |
| 7,913,155 B2 | 3/2011 | Basson et al. | |
| 8,199,166 B2 | 6/2012 | Repin et al. | |
| 8,255,163 B2 | 8/2012 | Mauldin et al. | |
| 8,378,839 B2 | 2/2013 | Montgomery et al. | |
| 8,805,616 B2 | 8/2014 | Hinkel et al. | |
| 9,046,509 B2 | 6/2015 | Dvorkin et al. | |
| 9,268,773 B2 | 2/2016 | Arango et al. | |
| 9,410,377 B2 | 8/2016 | Jain et al. | |
| 9,926,779 B2 | 3/2018 | Sugiura | |
| 9,982,525 B2 | 5/2018 | Brooks et al. | |
| 2002/0124652 A1 | 9/2002 | Schultz et al. | |
| 2005/0001737 A1 | 1/2005 | Baron et al. | |
| 2005/0279532 A1 | 12/2005 | Ballantyne et al. | |
| 2007/0215384 A1 * | 9/2007 | Ingerslew | E21B 44/00 |
| | | | 175/40 |
| 2011/0077924 A1 * | 3/2011 | Ertas | E21B 7/00 |
| | | | 703/2 |
| 2011/0245980 A1 * | 10/2011 | Nessjoen | E21B 44/00 |
| | | | 700/280 |
| 2012/0217067 A1 * | 8/2012 | Mebane, III | E21B 44/02 |
| | | | 175/57 |
| 2012/0277996 A1 | 11/2012 | Hurley | |
| 2013/0030706 A1 * | 1/2013 | Spencer | E21B 44/00 |
| | | | 702/9 |
| 2013/0049981 A1 | 2/2013 | MacPherson et al. | |
| 2015/0048705 A1 * | 2/2015 | Davey | E21B 4/00 |
| | | | 310/156.07 |
| 2015/0083493 A1 * | 3/2015 | Wassell | E21B 44/00 |
| | | | 175/40 |
| 2016/0333673 A1 | 11/2016 | Anno et al. | |
| 2016/0334306 A1 | 11/2016 | Chiu et al. | |
| 2017/0370203 A1 * | 12/2017 | Hadi | E21B 47/007 |
| 2020/0011751 A1 * | 1/2020 | Kazemi Miraki | G01L 3/26 |

FOREIGN PATENT DOCUMENTS

| | | |
|---|---|---|
| DE | 10359403 B4 | 12/2005 |
| WO | 2016183286 A1 | 11/2016 |

OTHER PUBLICATIONS

International Preliminary Report on Patentability for International Application No. PCT/US2019/023400 dated Sep. 29, 2020, 6 pages.

Chaotic R&d: "Chaotic Moon—Advanced Drilling Visualization & Optimization", Jul. 5, 2016 (Jul. 5, 2016), XP055863606, Retrieved from the Internet: URL:https://vimeo.com/173546319.

Gawski Victor et al: "A Step-Change Real-Time Directional Drilling Digital Interface", Mar. 25, 2009 (Mar. 25, 2009), pp. 1-8, XP055863282, ISBN: 978-88-94043-65-5 Retrieved from the Internet: URL:https://watermark.silverchair.com/omc- 2009-104.pdf.

Supplementary European Search Report for Application No. EP 19 77 0552 dated Dec. 12, 2021 (9 pages).

Zha Yang et al: "SPE-191723-MS Real Time Surface Data Driven WOB Estimation and Control", Sep. 24, 2018 (Sep. 24, 2018), pp. 1-17, XP055863212, Retrieved from the Internet:URL:https://watermark.silverchair.com/spe-191723-ms.pdf [retrieved on Nov. 18, 2021].

* cited by examiner

VIRTUAL DOWNHOLE SUB

CROSS-REFERENCE TO RELATED APPLICATION

This application claims the benefit of U.S. Provisional Application Ser. No. 62/647,056, filed Mar. 23, 2018, which is incorporated herein by reference in its entirety.

BACKGROUND

1. Field of the Invention

The present inventive concept relates to acquisition of data associated with drilling oil and gas wells. In particular, the present inventive concept concerns a system and method of obtaining data related to properties of a wellbore during a drilling operation from any position in the wellbore using a sensor positioned at a surface of the wellbore.

2. Description of Related Art

The process of forming an oil or gas well, i.e., a wellbore, presents a number of challenges due to changing and uncertain drilling conditions during a drilling operation of the wellbore, which may result in inefficiencies and even catastrophe. In attempt to improve efficiency of the drilling operation and avoid catastrophes, it is desirable to obtain wellbore data related to the drilling conditions during the drilling operation to permit an operator of the drilling operation to adapt to the drilling conditions.

Conventional systems and methods for obtaining the wellbore data utilize downhole data acquisition equipment, i.e. downhole subs and wired pipe, to monitor the drilling conditions during the drilling operation. Such conventional data acquisition equipment is expensive and suffers from slow data transfer rates, interrupted data transfers, and low quality data with insufficient information. Thus, in many instances, the wellbore data obtained via the conventional systems and methods is delayed or not received at all, which may prevent control of a drill-string by the operator and result in damage to the wellbore and/or the drill-string.

Accordingly, there is a need for a system and method to obtain real-time, high-quality wellbore data during a drilling operation.

SUMMARY

The present inventive concept provides system and method having one or more sensors positioned at a surface of a wellbore, e.g., on one or more surface subs, to acquire wellbore data during a drilling operation using a drill-string. The system is configured to map the wellbore data to one or more points along the drill-string and/or in the wellbore. In this manner, the system and method of the present inventive concept is configured to obtain real-time, high-quality wellbore data without using any equipment positioned below the surface of the wellbore, e.g., a downhole sub, thereby providing a virtual downhole sub.

The aforementioned may be achieved in an aspect of the present inventive concept by providing a system configured to identify a dysfunction of a drill-string within a wellbore. The system may include a sensor positioned on or near, e.g., proximate to, a drill-string. The sensor may also be positioned on or near, e.g., proximate to, a surface of the wellbore. The sensor may be configured to sense a surface condition and generate measurement data based on the surface condition sensed by the sensor. The sensor may include a tri-axial accelerometer and/or a torque sensor. The system may include a transmitter in communication with the sensor and configured to transmit the measurement data. The measurement data may include an acceleration measurement and/or a torque measurement. The measurement data may include a tri-axial measurement obtained using the tri-axial accelerometer and/or a torque measurement obtained using the torque sensor. The system may include a receiver in communication with the transmitter. The receiver may be configured to receive the measurement data from the sensor via the transmitter. The system may include a processor configured to calculate a downhole measurement based on the measurement data. The processor may be configured to analyze the downhole measurement to identify a dysfunction of the drilling operation and/or drill-string. The downhole measurement may include a downhole tri-axial measurement calculated, via the processor, based on the tri-axial measurement and/or a downhole torque measurement calculated, via the processor, based on the torque measurement. The processor may calculate the downhole measurement based on the measurement data using a power loss model.

The system may include a display configured to display a graphical user interface. The graphical user interface may be generated, via the processor, based on the downhole measurement. The system may include a surface sub positioned at or near, e.g., proximate to, a surface of the wellbore. The surface sub may be operable to house the sensor and/or the transmitter. The surface sub may be positioned below a top drive of the drill-string and/or above the drill-string.

The aforementioned may be achieved in another aspect of the present inventive concept by providing a method to identify a dysfunction of a drill-string. The method may be executed utilizing the system. The method may include the step of sensing, via a sensor, a surface condition of a wellbore. The sensor may be positioned at or near, e.g., proximate to, a drill-string and/or at or near, e.g., proximate to, a surface of the wellbore. The sensor may include a tri-axial accelerometer and/or a torque sensor. The method may include the step of generating, via the sensor, measurement data based on the surface condition of the wellbore. The method may include the step of transmitting, via a transmitter, the measurement data received from the sensor. The measurement data may include an acceleration measurement and/or a torque measurement. The measurement data may include a tri-axial measurement obtained from the tri-axial accelerometer and/or a torque measurement obtained from the torque sensor. The method may include the step of receiving, via a receiver, the measurement data from the transmitter. The method may include the step of calculating, via a processor, a downhole measurement based on the measurement data. The method may include the step of analyzing, via the processor, the downhole measurement to identify a dysfunction of the drill-string based on the measurement data. The downhole measurement may include a downhole tri-axial measurement calculated, via the processor, based on the tri-axial measurement and/or a downhole torque measurement calculated, via the processor, based on the torque measurement.

The method may include the step of calculating, via the processor, the downhole measurement based on the measurement data using a power loss model. The method may include the step of positioning, using the power loss model, a virtual tool at a fixed distance from a surface of the wellbore and/or at a fixed distance from a drill bit of the drill-string to calculate the downhole measurement at one or more of the fixed distances. The method may include the step of generating, via the processor, a graphical user interface based on the downhole measurement. The method may include the step of displaying, via a display, the graphical user interface. The method may include positioning a surface sub at or near, e.g., proximate to, the surface of the wellbore. The method may include the step of housing the sensor and/or the transmitter on or in the surface sub. The surface sub may be positioned below a top drive of the drill-string and/or above the drill-string.

The foregoing is intended to be illustrative and is not meant in a limiting sense. Many features of the embodiments may be employed with or without reference to other features of any of the embodiments. Additional aspects, advantages, and/or utilities of the present inventive concept will be set forth in part in the description that follows and, in part, will be apparent from the description, or may be learned by practice of the present inventive concept.

BRIEF DESCRIPTION OF THE DRAWINGS

The foregoing summary, as well as the following detailed description, will be better understood when read in conjunction with the appended drawing. For the purpose of illustration, there is shown in the drawing certain embodiments of the present inventive concept. It should be understood, however, that the present inventive concept is not limited to the precise embodiments and features shown. The accompanying drawing, which is incorporated in and constitutes a part of this specification, illustrates an implementation of apparatuses consistent with the present inventive concept and, together with the description, serves to explain advantages and principles consistent with the present inventive concept, in which.

DETAILED DESCRIPTION

The following detailed description references the accompanying drawings that illustrate various embodiments of the present inventive concept. The illustrations and description are intended to describe aspects and embodiments of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

I. Terminology

In the description, phraseology and terminology are employed for the purpose of description and should not be regarded as limiting. For example, the use of a singular term, such as "a", is not intended as limiting of the number of items. Also, the use of relational terms such as, but not limited to, "down" and "up", are used in the description for clarity in specific reference to the figure and are not intended to limit the scope of the present inventive concept or the appended claims. Further, any one of the features of the present inventive concept may be used separately or in combination with any other feature. For example, references to the term "embodiment" means that the feature or features being referred to are included in at least one aspect of the present inventive concept. Separate references to the term "embodiment" in this description do not necessarily refer to the same embodiment and are also not mutually exclusive unless so stated and/or except as will be readily apparent to those skilled in the art from the description. For example, a feature, structure, process, step, action, or the like described in one embodiment may also be included in other embodiments, but is not necessarily included. Thus, the present inventive concept may include a variety of combinations and/or integrations of the embodiments described herein. Additionally, all aspects of the present inventive concept as described herein are not essential for its practice.

Further, in certain situations, the term "logic" refers to hardware, firmware, software, and/or a combination thereof that is configured to perform one or more functions including, but not limited to, those functions of the present inventive concept specifically described herein or are readily apparent to those skilled in the art in view of the description. Such logic may include circuitry having data processing and/or storage functionality. Examples of such circuitry may include, but are not limited to, a microprocessor, one or more processors, e.g., processor cores, a programmable gate array, a microcontroller, an application specific integrated circuit, a wireless receiver, transmitter and/or transceiver circuitry, semiconductor memory, or combinatorial logic. Logic may be in the form of one or more software modules, such as executable code in the form of an executable application, an application programming interface (API), a subroutine, a function, a procedure, an applet, a servlet, a routine, source code, object code, a shared library/dynamic load library, or one or more instructions. These software modules may be stored in any type of a suitable non-transitory storage medium, or transitory storage medium, e.g., electrical, optical, acoustical or other form of propagated signals such as carrier waves, infrared signals, or digital signals. Examples of non-transitory storage medium may include, but are not limited or restricted to a programmable circuit, a semiconductor memory, non-persistent storage such as volatile memory, e.g., any type of random access memory "RAM", persistent storage such as non-volatile memory, e.g., read-only memory "ROM", power-backed RAM, flash memory, phase-change memory, etc., a solid-state drive, hard disk drive, an optical disc drive, or a portable memory device. As firmware, the executable code is stored in persistent storage.

The term "operator" is generally used herein to represent a user of the system and/or method of the present inventive concept. For purposes herein, the user may be an administrator of the system, a drilling engineer, or a team of engineers.

Lastly, the terms "or" and "and/or" as used herein are to be interpreted as inclusive or meaning any one or any combination. Therefore, "A, B or C" or "A, B and/or C" mean any of the following: "A"; "B"; "C"; "A and B"; "A and C"; "B and C"; or "A, B and C." An exception to this definition will occur only when a combination of elements, functions, steps or acts are in some way inherently mutually exclusive.

II. General Architecture

Figure 1A:
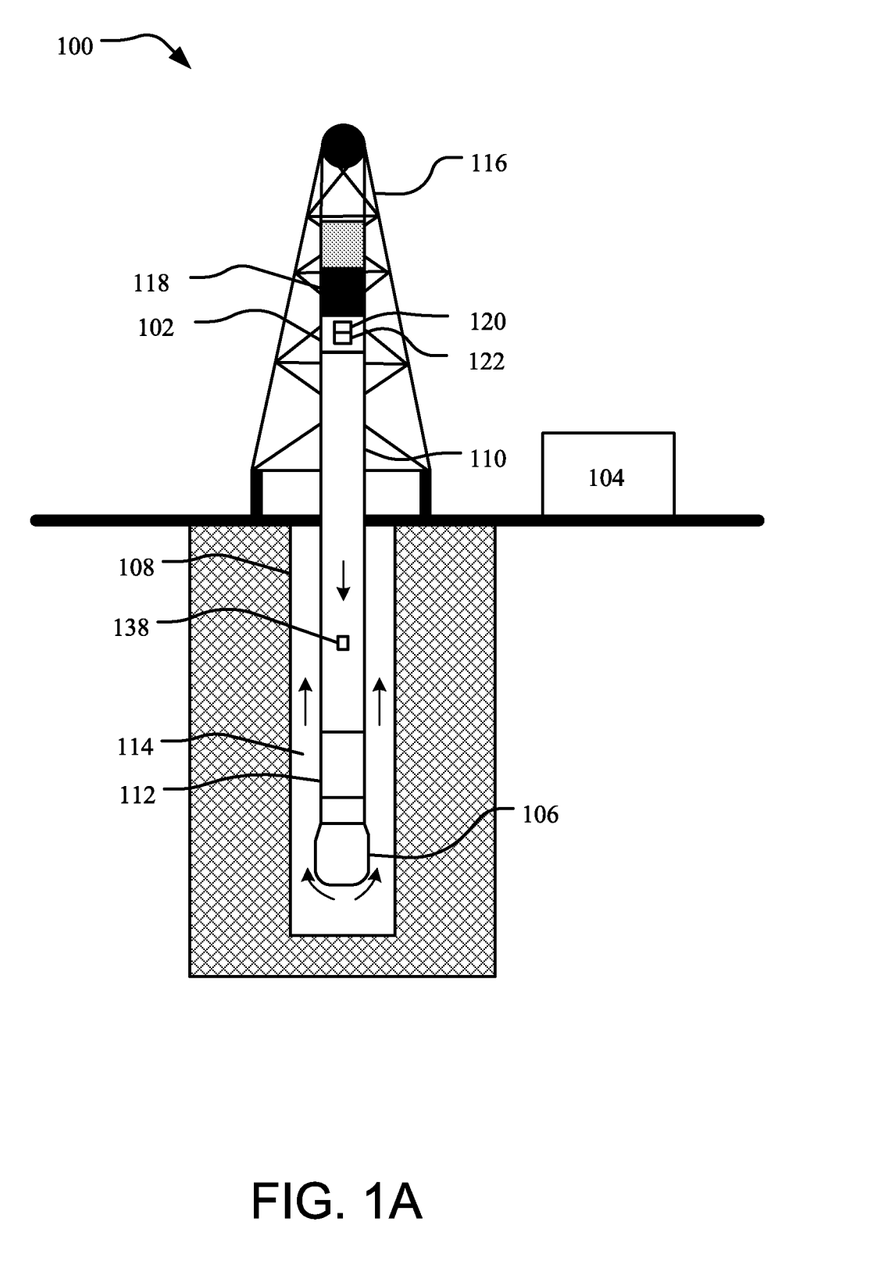
FIG. 1A is a diagram illustrating a system of the present inventive concept with a drilling rig with a drill-string, a sensor, and supporting facilities in use with a wellbore during a drilling operation.
Figure 1B:
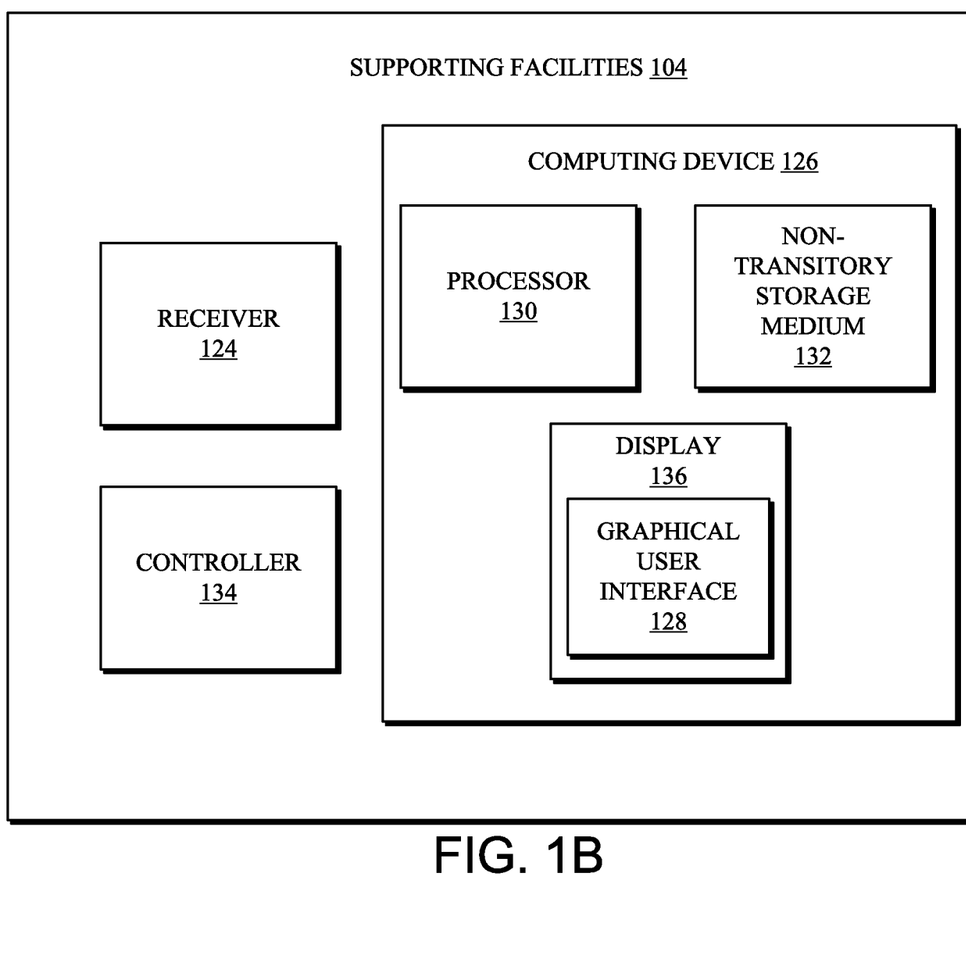
FIG. 1B is a diagram of the supporting facilities of FIG. 1A having a receiver, a controller, and a computing device with a processor, a non-transitory storage medium, and a display.

Turning to FIGS. 1A-B, a virtual downhole sub system 100 of the present inventive concept is illustrated in use with a drilling rig 116 having a top drive motor 118 at a surface of a wellbore 108 and supporting facilities 104 positioned at a top of the wellbore 108. The drilling rig 116 includes a drill-string 110 extending into the wellbore 108 and a surface sub 102. The wellbore 108 extends into the ground and is formed via a drilling operation using the drill-string 110. A depth of the wellbore 108 can range from a few feet to over a mile into the ground and can extend in one or more directions. The drill-string 110 includes drill pipe having one or more sections. The surface sub 102 is positioned at the surface of the wellbore 108, above the drill-string 110 and below the top drive motor 118. In this manner, when a new section of the drill pipe is installed on the drill-string 110, for example to extend the drill-string 110 further into the wellbore 108 during the drilling operation, the new section of the drill pipe is installed below the surface sub 102. It is foreseen, however, that the surface sub 102 may be positioned anywhere along the drill-string 110 without deviating from the scope of the present inventive concept. The drill-string 110 also includes a bottom hole assembly (BHA) 112 positioned at a bottom of the drill-string 110. The BHA 112 includes a plurality of components. In the exemplary embodiment, the BHA 112 includes a steering unit, a mud motor, a drill motor, a drill collar, and a drill bit 106. It is foreseen that the BHA 112 may include fewer or additional components without deviating from the scope of the present inventive concept. The drill-string 110 extends into the wellbore 108 so that the drill bit 106 of the BHA 112 is in contact with a geological formation to crush and/or scrape the geological formation, thereby increasing a length of the wellbore 108 in a downward direction and/or a lateral direction. In the exemplary embodiment, the drill bit 106 is driven by the top drive motor 118 and/or the mud motor positioned near the drill bit 106. It is foreseen, however, that the drilling rig 116 may use a kelly drive or a rotary table to drive the drill bit 106 without deviating from the scope of the present inventive concept.

During the drilling operation, drilling mud or a drilling fluid 114 is continuously circulated within the wellbore 108 via a pump to facilitate operation of the BHA 112, e.g., drilling. The fluid 114 is introduced into the drill-string 110 via an opening of the drill-string 110 and pumped down the drill-string 110 and through the BHA 112 via the pump. The fluid 114 exits the drill-string 110 through the drill bit 106 and circulates upwards through an annulus of the wellbore 108. The fluid 114 has multiple functions including, but not limited to, cooling the drill bit 106, lubricating the drill bit 106, and/or transporting debris generated by the drill bit 106 away from the drill bit 106, e.g., up the annulus of the wellbore 108 and to the surface of the wellbore 108. The fluid 114 may be water, oil, a synthetic based composition, gas, or a combination thereof, and may include one or more additives and/or particles.

The system 100 includes a sensor 120 configured to sense a surface condition of the wellbore 108 and generate measurement data based on the surface condition of the wellbore 108. It is foreseen that the sensor 120 may include one or a plurality of same or different sensors without deviating from the scope of the present inventive concept. For instance, it is foreseen that the sensor 120 may be, or include, a strain gauge, gyroscope, and/or seismometer without deviating from the scope of the present inventive concept. It is foreseen that the sensor 120 may be configured to sense vibration, speed, weight-on-bit, tension, and/or pressure without deviating from the scope of the present inventive concept. In the exemplary embodiment, the sensor 120 includes a high fidelity torque sensor configured to sense torque of the drill-string 110 and/or a high fidelity tri-axial acceleration sensor configured to sense lateral acceleration along the x-axis and/or the y-axis, and/or axial acceleration along the z-axis of the sensor 120 relative to the wellbore 108. In this manner, the sensor 120 is configured to generate a torque measurement and/or a tri-axial acceleration measurement of the drill-string 110.

In the exemplary embodiment, the sensor 120 is housed in the surface sub 102, which is positioned at the surface of the wellbore 108. In this manner, the measurement data is generated, via the sensor 120, at the surface of the wellbore 108, which facilitates reliable, real-time transmission of the measurement data to the supporting facilities 104 for at least the reason that the transmission of the measurement data does not have to travel through the wellbore 108, e.g., from a conventional downhole sub. Further, by using equipment at the surface of the wellbore 108, the system 100 is not subject to the harsh drilling conditions encountered by conventional downhole equipment. It is foreseen, however, that the sensor 120 may be positioned anywhere adjacent or proximate to the drill-string 110 and/or along the drill-string 110 without deviating from the scope of the present inventive concept. As used herein "proximate to the drill-string 110" means the sensor 120 may be located on top of the drill-string 110, along the drill-string 110, or within a five-foot (5') radius from the drill-string 110 without deviating from the scope of the present inventive concept. It is also foreseen that the sensor 120 may also be positioned anywhere proximate to the surface of the wellbore 108 without deviating from the scope of the present inventive concept. As used herein, "proximate to the surface of the wellbore 108" means the sensor 120 may be located on the surface of the wellbore 108, above the surface of the wellbore 108, below the surface of the wellbore 108, within ninety-five feet (95') from the surface of the wellbore 108, or within a proximity required to wirelessly transmit the measurement data in real time, i.e., a distance based on wireless-transmission capabilities of equipment, e.g., the sensor 120, a transmitter 122, and/or a receiver 124, without deviating from the scope of the present inventive concept.

The system 100 includes the transmitter 122 in communication with the sensor 120, e.g., via a wired or wireless connection. The transmitter 122 is configured to wirelessly transmit the measurement data from the sensor 120 to the receiver 124 of the supporting facilities 104. In the exemplary embodiment, the measurement data is transmitted from the transmitter 122 to the receiver 124 via a wireless connection of a wireless network, although it is foreseen that the measurement data can be transmitted to the receiver 124 via a wired connection without deviating from the scope of the present inventive concept. In the exemplary embodiment, the transmitter 122 is housed in the surface sub 102, although it is foreseen that the transmitter 122 can be positioned anywhere along the drill-string 110 without deviating from the scope of the present inventive concept.

In addition to the receiver 124, the supporting facilities 104 include a computing device 126 and a controller 134. In the exemplary embodiment, the supporting facilities 104 are located at or within a half-mile radius of the drilling rig 116, although it is foreseen that the supporting facilities 104 can be located any distance from the drilling rig 116 or integrated into another facility or building without deviating from the scope of the present inventive concept. The computing device 126 includes a processor 130, a non-transitory storage medium 132, and a display 136. Upon receipt of the measurement data via the receiver 124, the non-transitory storage medium 132 is configured to store the measurement data for processing via the processor 130. The processor 130 is configured to process the measurement data by executing program logic, which is also stored in the non-transitory storage medium 132. Using the program logic, the processor 130 is configured to calculate one or more downhole measurements based on the measurement data. In the exemplary embodiment, the processor 130 uses a power loss model to calculate the one or more downhole measurements, although it is foreseen that the processor 130 may use any model or a combination of models to calculate the one or more downhole measurements without deviating from the scope of the present inventive concept. By using a physics-based model, the system 100 can calculate the one or more downhole measurements regardless of drill-string components, e.g. length or material of the drill-string 110, components on the drill-string 110, method of rotating the drill-string 110, or type of drill bit 106. In the exemplary embodiment, the one or more downhole measurements include a downhole tri-axial acceleration measurement and/or a downhole torque measurement. It is foreseen, however, that the one or more downhole measurements may be calculated to include any parameter and/or determine any property associated with the drill-string 110, the wellbore 108, and/or the drilling operation without deviating from the scope of the present inventive concept. The downhole tri-axial acceleration measurement is calculated, via the processor 130, based on the tri-axial acceleration measurement obtained via the sensor 120 at the surface of the wellbore 108. The downhole torque measurement is calculated, via the processor 130, based on the torque measurement obtained via the sensor 120 at the surface of the wellbore 108.

The one or more downhole measurements are calculated, via the processor 130, at a fixed position relative to the wellbore 108 and/or the drill-string 110 and/or a relative position to the wellbore 108 and/or the drill-string 110. For example, the downhole measurement can be calculated, via the processor 130, to continuously determine a drilling parameter of the drill-string 110 at a fixed positioned relative to the wellbore 108, e.g., two thousand feet (2000') below the surface of the wellbore 108. In this example, the downhole measurements are calculated at the same fixed position relative to the wellbore 108, but at different positions relative to the drill-string 110 as the drill-string 110 advances laterally and/or horizontally in the wellbore 108. In another example, the downhole measurement can be calculated, via the processor 130, to continuously determine a drilling parameter of the drill-string 110 at a fixed position relative to the drill-string 110, e.g., ten feet (10') above the drill bit 106. In this example, the downhole measurements are calculated at the same fixed position relative to the drill-string 110, but at different positions relative to the wellbore 108, which changes as the drill bit 106 advances vertically and/or laterally in the wellbore 108. In this manner, the system 100 is configured to obtain the measurement data from the sensor 120 at the surface of the wellbore 108, without use of downhole equipment, e.g., a downhole sub or a downhole sensor, and map the measurement data to one or more downhole positions along the drill-string 110. Thus, the system 100 is configured to virtually position a virtual tool or virtual downhole sub 138 at a fixed distance from the surface of the wellbore 108 and/or at a fixed distance from the drill bit 106, e.g., using the power loss model, thereby enabling calculation of the downhole measurement via the virtual downhole sub 138.

Using the program logic, the system 100 is configured to monitor the drill-string 110 to, for instance, identify a dysfunction of the drill-string 110 via analysis of the downhole measurement, via the processor 130. The dysfunction of the drill-string 110 may include bit whirl, stick-slip, bit bounce, and/or other interference with the drilling operation and/or the drill-string 110. In the exemplary embodiment, the downhole torque measurement is used to identify stick-slip vibration of the drill-string 110 during the drilling operation. The downhole torque measurement is also used to indicate rotations per minute (RPM) of the drill-string 110, e.g. at the drill bit 106. It is foreseen that the downhole measurement can be used to identify one or more dysfunctions of different types without deviating from the scope of the present inventive concept.

Using the program logic, the processor 130 is also configured to determine a control setting based on the downhole measurement to mitigate the dysfunction of the drill-string 110. The controller 134 is configured to implement the control setting by modifying one or more drilling parameters of the drill-string 110 during the drilling operation. In the exemplary embodiment, the controller 134 is configured to mitigate stick-slip vibration of the drill-string 110 by controlling a top drive RPM of the top drive motor 118 using the control setting. It is foreseen, however, that the controller 134 can mitigate one or more dysfunctions of the drill-string 110 by controlling any parameter of the drilling rig 116, e.g. modifying a weight-on-bit of the drill-string 110, without deviating from the scope of the present inventive concept.

Figure 2:
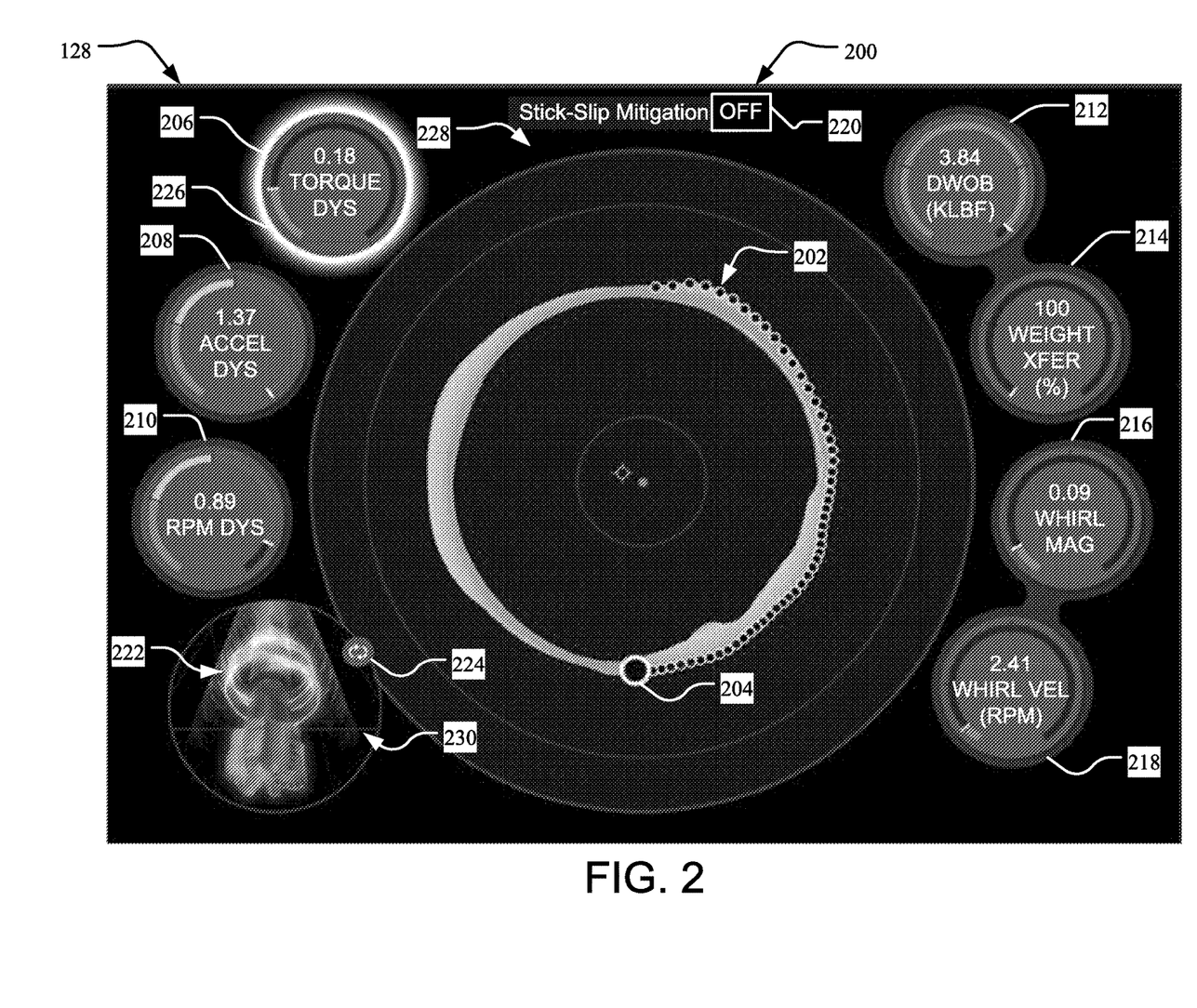
FIG. 2 is a diagram of a graphical user interface displaying, via the display of FIG. 1B, a normal condition of the drilling operation using the drill-string of FIG. 1A.
Figure 3:
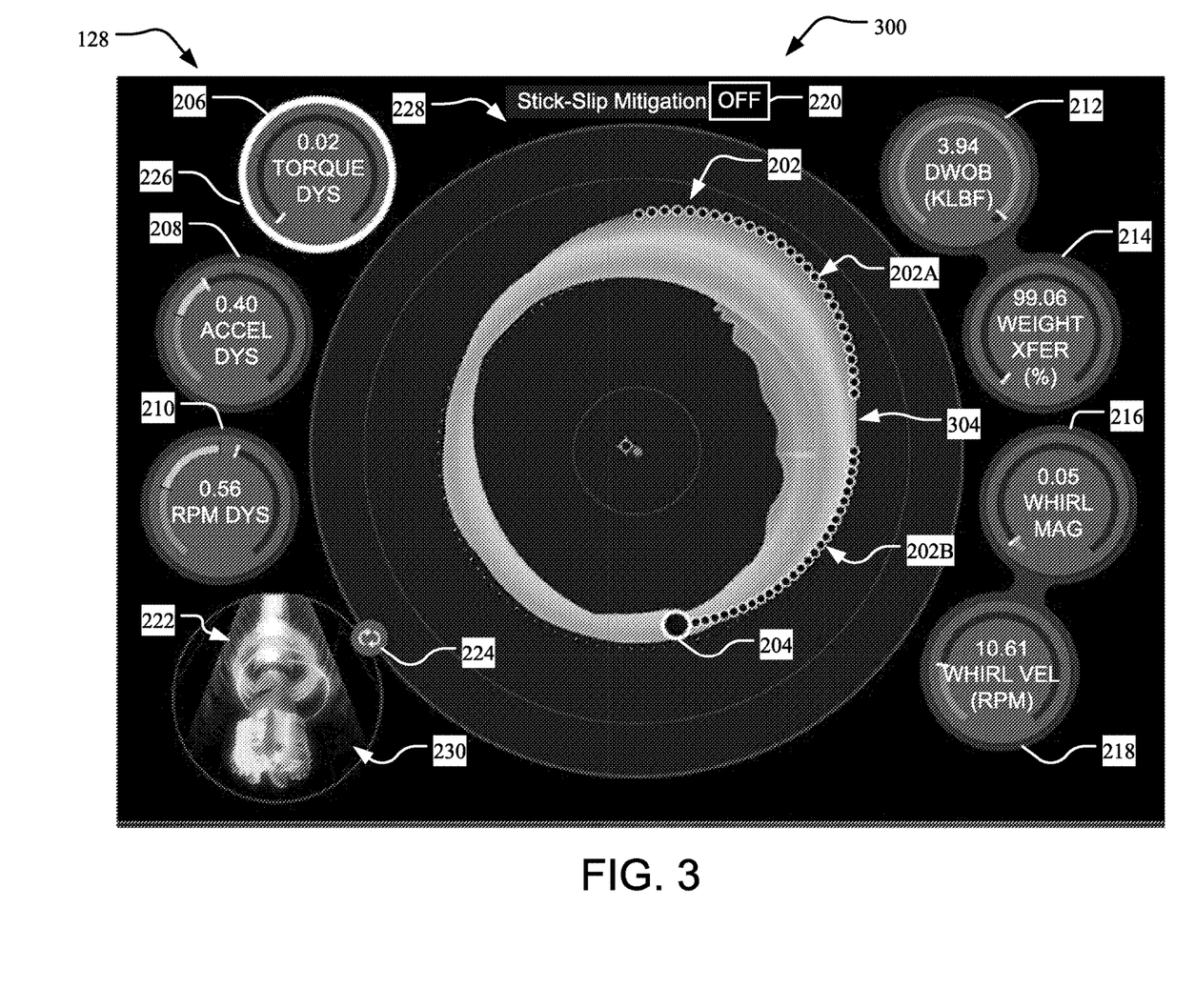
FIG. 3 is a diagram of the graphical user interface displaying, via the display of FIG. 1B, a dysfunction of the drill-string during the drilling operation of FIG. 1A.

Using the program logic, the processor 130 is configured to generate a graphical user interface (GUI) 128 based on the downhole measurement. The processor 130 is configured to cause the GUI 128 to be displayed via the display 136 using the program logic. FIGS. 2 and 3 illustrate examples of the GUI 128 in the form of a first screenshot 200 and a second screenshot 300. The screenshots 200, 300 are generated by the processor 130 based on different downhole measurements taken at different times during the drilling operation and displayed by the display 136. The GUI 128 is configured to illustrate, via the display 136, one or more aspects of the drilling operation in real-time time using one or more digital representations in a two-dimensional (2D) format or a three-dimensional (3D) format. In the exemplary embodiment, the GUI 128 utilizes digital representations of a plurality of gauges to illustrate a plurality of aspects of the drilling operation. It is foreseen, however, that the processor 130 may be configured to generate the GUI 128 with any number of gauges or other representations to illustrate one or more of the plurality of aspects of the drilling operation without deviating from the scope of the present inventive concept. The plurality of aspects illustrated via the plurality of gauges of the GUI 128 may include one or more drilling parameters of the system 100, for example, as set by the controller 134, and/or one or more dysfunctions of the drilling operation based on the downhole measurement, for example, the dysfunction of the drill-string 110. In the event of the dysfunction of the drill-string 110, the GUI 128 is configured to graphically illustrate the dysfunction to the operator in real-time using one or more of the plurality of gauges. In the exemplary embodiment, the plurality of gauges includes a torque dysfunction gauge 206, an acceleration dysfunction gauge 208, an RPM dysfunction gauge 210, a downhole weight-on-bit gauge 212, a weight transfer gauge 214, a whirl magnitude gauge 216, and a whirl velocity gauge 218, and a minimized gauge 230, which are positioned around a perimeter of a center gauge 228. Each of the gauges 206, 208, 210, 212, 214, 216, 218 is configured to display a respective one of the plurality of aspects of the drilling operation via two representations, i.e., a representation of an analog-style meter and a representation of a digital-style meter. In this manner, the two representations collaboratively indicate to the operator a respective one of the plurality of aspects of the drilling operation. For example, the torque dysfunction gauge 206 is illustrated with the analog-style meter at an escalated position and the digital-style meter at 0.18, which indicates to the operator a level of torque dysfunction in the drill-string 110. The GUI 128 is configured to provide a selection indicator 226 to the operator, for instance, when the operator has selected one of the gauges 206, 208, 210, 212, 214, 216, 218 for visualization, e.g., visualization of a dysfunction associated with the one of the gauges 206, 208, 210, 212, 214, 216, 218 via the center gauge 228. The selection indicator 226 causes an outer circumference of the one or more of the gauges 206, 208, 210, 212, 214, 216, 218 to be illuminated to indicate which dysfunction is currently being visualized, e.g., currently being displayed by the center gauge 228. For example, the torque dysfunction gauge 206 includes the selection indicator 226.

The center gauge 228 and the minimized gauge 230 provide representations of the drill-string 110 and/or the drill bit 106 during the drilling operation based on the downhole measurement, which can be selectively switched between the center gauge 228 to illustrate a maximized view of the representation, and the minimized gauge 230 to illustrate a minimized view of the representation. In the exemplary embodiment, the center gauge 228 illustrates the downhole measurement in a 2D format via a cluster of dots 202 extending about a representation of the drill-string 110. It is foreseen that the downhole measurement can be displayed via a line graph, a tri-axial line or dot graph, and/or the like, without deviating from the scope of the present inventive concept. The cluster of dots 202 represent a revolution of the drill-string 110 within a plane normal to the drill-string 110 and with an enlarged one 204 of the cluster of dots 202 indicating a current revolution of the drill-string 110. If the drilling operation is normal, each dot of the cluster of dots 202 is evenly and concentrically spaced with respect to others of the cluster of dots 202 about a portion of the representation of the drill-string 110. For example, in the first screenshot 200, ones of the cluster of dots 202 are evenly spaced relative to each other at 10 ms increments, which indicate to the operator that the drilling operation is operating normally or is dysfunction-free. Abnormalities in the spacing and/or concentricity of ones of the cluster of dots 202, e.g. a gap between dots, tightly spaced dots, and/or non-concentric spacing of the dots, indicate to the operator that the drilling operation is experiencing one or more dysfunctions. For example, in the second screenshot 300, a gap 304 is formed between the cluster of dots 202, which causes the cluster of dots 202 to be divided into a first set 202A of the cluster of dots 202 and a second set 202B of the cluster of dots 202. The gap 304 indicates to the operator that the drill-string 110 has experienced a dysfunction. In the example, the drill-string 110 experienced a degree of stick-slip, when the drill bit 106 became stuck and stopped rotating, and the top drive motor 118 continued rotating. The even spacing of the second set 202B of the cluster of dots 202 following the gap 304 indicates that the drill-string 110 had sufficient energy to cause the drill bit 106 to break free, accelerate a distance within a period of time, e.g., 10 ms, and resume a prior or normal rotation. As also illustrated via the second screenshot 300, the first set 202A of the cluster of dots 202 are spaced non-concentrically, which indicates to the operator that the drill bit 106 is experiencing bit whirl. In the exemplary embodiment, the minimized gauge 230 of the GUI 128 illustrates the downhole measurement in a 3D format via a representation of the drill-string 110 and the drill bit 106. The minimized gauge 230 illustrates the revolution of the drill-string 110 of the center gauge 228 via a swirl 222 that extends around the drill-string 110 to also illustrate one or more prior revolutions of the drill-string 110. The operator can switch between the representations of the center gauge 228 and the minimized gauge 230 via a toggle control 224. For instance, when the toggle control 224 is selectively actuated, e.g., via the operator by interacting with the GUI 128, the representation of the center gauge 228 is moved to and displayed by the minimized gauge 230, and the representation of minimized gauge 230 is moved to and displayed by the center gauge 228. In this manner, the center gauge 228 and the minimized gauge 230 collaboratively allow the operator to visualize motion of the drill-string 110 and/or the drill bit 106 during the drilling operation based on the downhole measurement, which may help the operator determine if the drill-string 110 is experiencing problems, e.g., the dysfunction.

The GUI 128 includes a stick-slip mitigation control 220 to indicate to the operator if stick-slip mitigation is engaged via the controller 134 of the system 100. The stick-slip mitigation control 220 can be manually operated, e.g., activated and/or deactivated, via the operator and the controller 134 and/or automatically operated, e.g., activated and/or deactivated, via the controller 134 of the system 100 based on the downhole measurement.

The screenshots 200, 300 may be stored in the non-transitory storage medium 132 to allow, for example, further analysis by the operator and/or a historical analysis of the drilling operation. In this manner, the GUI 128 displayed, via the display 136, efficiently communicates a plurality of aspects of the drilling operation to the operator based on the downhole measurement during the drilling operation.

Figure 4:
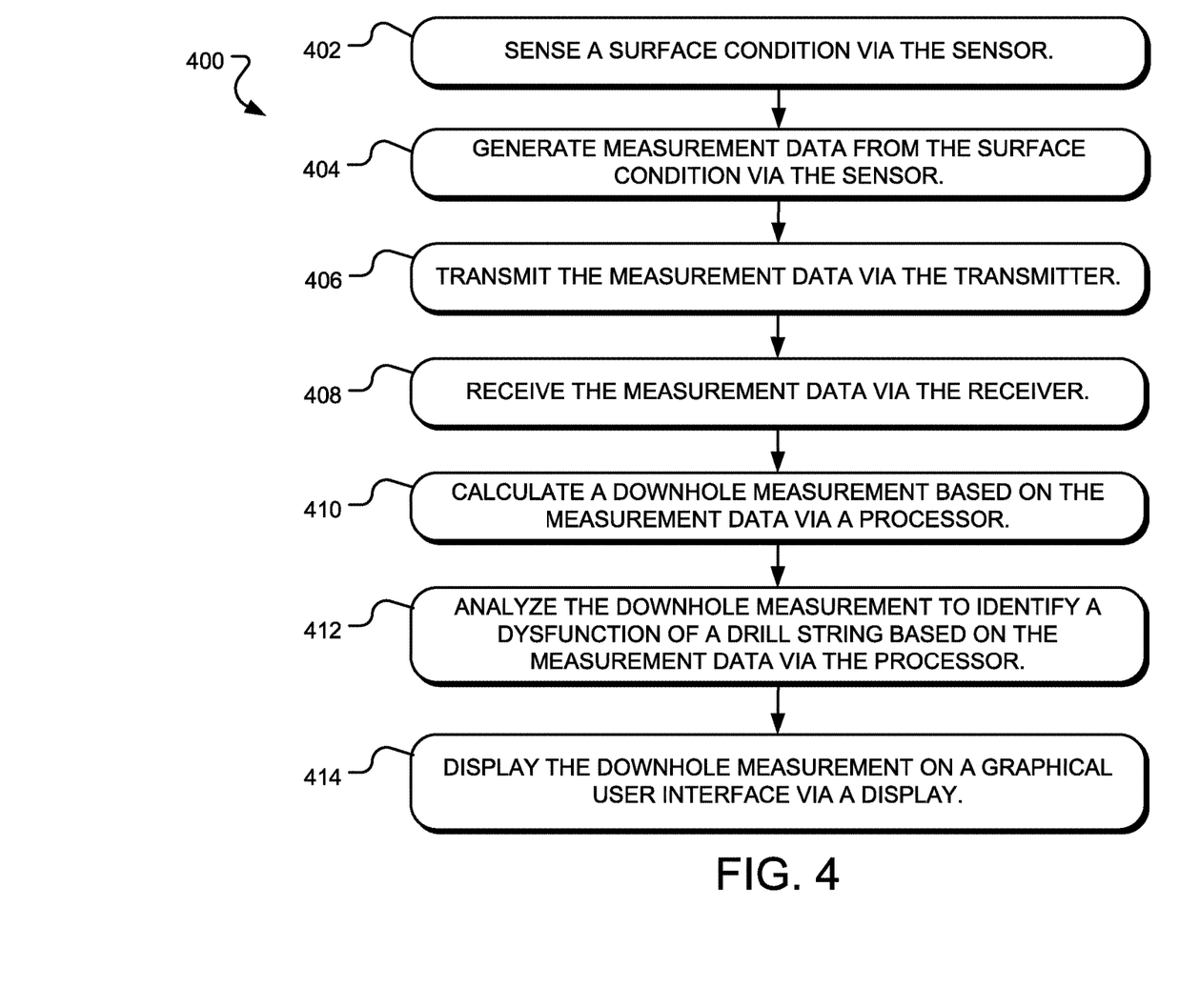
FIG. 4 is a flow chart illustrating a method to identify the dysfunction of the drill-string during the drilling operation of FIG. 1A.

Turning to FIG. 4, a flow chart illustrating a method 400 to identify the dysfunction of the drill-string 110 using the system 100 is shown. The method 400 is provided by way of example, as there are a variety of ways to carry out the method 400. The method 400, as described hereafter, can be carried out using the configurations and examples illustrated in FIG. 1A-3, for example, and various elements of these figures are referenced in explaining the method 400. Each block shown in FIG. 4 represents one or more processes, methods or subroutines, carried out in the method 400. Furthermore, the illustrated order of blocks is illustrative only and the order of the blocks can change according to the present disclosure. Additional blocks may be added or fewer blocks may be utilized, without departing from this disclosure. The method 400 can begin at block 402. At block 402, a surface condition is sensed via a sensor, such as in FIG. 1A. The sensor may be positioned proximate to a surface of a wellbore and proximate to the drill-string 110. At block 404, measurement data is generated from the surface condition via the sensor. At block 406, the measurement data is transmitted via a transmitter, such as in FIG. 1A. At block 408, the measurement data is received via a receiver, such as in FIG. 1B. At block 410, a downhole measurement is calculated based on the measurement data via a processor, such as in FIG. 1B. At block 412, the downhole measurement is analyzed to identify a dysfunction of the drill-string 110 based on the measurement data via the processor. At block 414, the downhole measurement is displayed on a graphical user interface, such as in FIGS. 2-3, via a display, such as in FIG. 1B.

Accordingly, the present inventive concept provides a system and method having one or more sensors positioned at a surface of a wellbore, e.g., on one or more surface subs, to acquire wellbore data during a drilling operation using a drill-string, and map the wellbore data to one or more points along the drill-string and/or in the wellbore. In this manner, the system and method of the present inventive concept is configured to obtain real-time, high-quality wellbore data without any equipment positioned below the surface of the wellbore, e.g., a downhole sub, thereby providing a virtual downhole sub.

It will be appreciated by those skilled in the art that changes could be made to the embodiments described above without departing from the broad inventive concept thereof. It is understood, therefore, that the present inventive concept disclosed herein is not limited to the particular embodiments disclosed, and is intended to cover modifications within the spirit and scope of the present inventive concept.

What is claimed is:

1. A method for to identify a dysfunction identification for a drill-string deployed in a wellbore, the method comprising:
    virtually positioning a virtual sub at a distance from at least one of the drill-string or the wellbore;
    sensing a surface condition of a wellbore, the surface condition of the wellbore captured using at least one sensor positioned at a surface of the wellbore, the at least one sensor including a tri-axial accelerometer that senses a tri-axial acceleration of the drill-string;
    generating measurement data based on the surface condition of the wellbore, the measurement data including a tri-axial measurement generated based on the tri-axial acceleration;
    generating a downhole measurement based on the measurement data using the virtual sub and without using any equipment positioned below the surface of the wellbore, the downhole measurement including a downhole tri-axial measurement generated using the tri-axial measurement of the measurement data generated based on the surface condition of the wellbore
    identifying a dysfunction of the drill-string based on the downhole measurement, the dysfunction represented as a visualization with a graphical user interface, the visualization including a first spacing between a plurality of visual representations representing a drill rotation of the drill-string and a second spacing between the plurality of visual representations representing a drill angle of the drill-string; and
    performing, in response to the dysfunction, stick-slip mitigation by controlling a top drive revolutions per minute (RPM)s.

2. The method of claim 1, wherein the measurement data further includes a torque measurement.

3. The method according of claim 2, wherein the downhole measurement further includes a downhole torque measurement generated based on the torque measurement.

4. The method of claim 1, wherein the downhole measurement is generated based on the measurement data using a power loss model.

5. The method of claim 4, wherein the distance is a fixed distance from the surface of the wellbore and the downhole measurement is calculated at the fixed distance using the power loss model.

6. The method of claim 4, wherein the distance is a fixed distance from a drill bit of the drill-string and the downhole measurement is calculated at the fixed distance using the power loss model.

7. The method of claim 1, further comprising:
    wirelessly transmitting the measurement data from a transmitter to a receiver.

8. The system of claim 1 wherein performing the stick-slip mitigation is based on receiving an operator input activating stick-slip mitigation control.

9. A system for dysfunction identification for a drill-string within a wellbore, the system comprising:
    at least one sensor positioned at a surface of the wellbore, the at least one sensor capturing a surface condition of the wellbore, wherein measurement data is generated based on the surface condition of the wellbore, the at least one sensor including a tri-axial accelerometer that captures a tri-axial acceleration of the drill-string and outputs a tri-axial measurement, the measurement data including the tri-axial measurement;
    a transmitter in communication with the at least one sensor, the transmitter transmitting the measurement data;
    a receiver receiving the measurement data from the transmitter;
    at least one computing device in communication with the receiver, the at least one computing device virtually positioning a virtual sub at a distance from at least one of the wellbore or the drill-string, the at least one computing device calculating a downhole measurement based on the measurement data using the virtual sub and without using any equipment positioned below the surface of the wellbore, the downhole measurement including a downhole tri-axial measurement calculated from the tri-axial measurement of the measurement data generated based on the surface condition of the wellbore, the at least one computing device identifying the dysfunction of the drill-string within the wellbore based on the downhole measurement; and
    a display displaying a graphical user interface, the graphical user interface generated based on the downhole measurement and using the at least one computing device, the graphical user interface displaying a visualization of the dysfunction using a selection between a two-dimensional visualization or a three-dimensional visualization, the graphical user interface displaying a first spacing between a plurality of visual representations representing a drill rotation of the drill-string and a second spacing between the plurality of visual representations representing a drill angle of the drill-string.

10. The system of claim 9, further comprising:
    a surface sub housing the at least one sensor and the transmitter and positioned proximate to the surface of the wellbore.

11. The system of claim 10, wherein the surface sub is positioned below a top drive of the drill-string.

12. The system of claim 9, further comprising:
    a controller controlling the drill-string by modifying one or more drilling parameters based on the dysfunction.

13. The system of claim 9, wherein the virtual sub is positioned at the distance using a power loss model.

14. The system of claim 13, wherein the downhole measurement is calculated at the distance using the power loss model.

15. The system of claim 9, wherein the plurality of visual representations is a plurality of dots and the second spacing is a concentric spacing.

16. The system of claim 9, wherein the graphical user interface displays an indication of whether a stick-slip mitigation is engaged or disengaged.

17. The system of claim 9, wherein the graphical user interface displays a center portion representing the dysfunction and one or more minimized portions around the center portion representing the measurement data.

18. A system for a dysfunction identification for a drill-string within a wellbore, the system comprising:
   at least one sensor positioned at a surface of the wellbore separate from and within a five-foot radius of the drill-string, the at least one sensor capturing a surface condition of the wellbore, wherein measurement data is generated based on the surface condition of the wellbore, the at least one sensor including a tri-axial accelerometer that senses a tri-axial acceleration of the drill-string and outputs a tri-axial measurement, the measurement data including the tri-axial measurement; and
   at least one computing device in communication with the at least one sensor, the at least one computing device virtually positioning a virtual sub at a distance from at least one of the wellbore or the drill-string, the at least one computing device calculating a downhole measurement based on the measurement data using the virtual sub and without using any equipment positioned below the surface of the wellbore, the downhole measurement including a downhole tri-axial measurement calculated from the tri-axial measurement of the measurement data generated based on the surface condition of the wellbore using a power loss model, the at least one computing device identifying a dysfunction based on the downhole measurement, the dysfunction represented as a visualization with a graphical user interface, the visualization including a first spacing between a plurality of visual representations representing a drill rotation of the drill-string and a second spacing between the plurality of visual representations representing a drill angle of the drill-string.

19. The system of claim 18, further comprising:
   a controller controlling the drill-string by modifying one or more drilling parameters of the drill-string based on the downhole measurement.

* * * * *